Apr. 3, 1923.

A. H. WILLIAMS 1,450,533

STORAGE BATTERY AND PROCESS OF PRODUCING THE SAME

Filed Apr. 16, 1920

Inventor.
Albert H. Williams
by Heard Smith & Tennant.
Attys.

Patented Apr. 3, 1923.

1,450,533

UNITED STATES PATENT OFFICE.

ALBERT H. WILLIAMS, OF WORCESTER, MASSACHUSETTS, ASSIGNOR TO IONITE STORAGE BATTERY CO., OF WORCESTER, MASSACHUSETTS, A CORPORATION OF MASSACHUSETTS.

STORAGE BATTERY AND PROCESS OF PRODUCING THE SAME.

Application filed April 16, 1920. Serial No. 374,360.

*To all whom it may concern:*

Be it known that I, ALBERT H. WILLIAMS, a citizen of the United States, and resident of Worcester, county of Worcester, State of Massachusetts, have invented an Improvement in Storage Batteries and Processes of Producing the Same, of which the following description, in connection with the accompanying drawing, is a specification, like characters on the drawing representing like parts.

This invention relates to improvements in storage batteries and the process of producing the same and the general object thereof is to provide a storage battery which will have a greater efficiency and a longer life than batteries heretofore constructed and which can be produced at a much less cost, and in a shorter time.

More specifically the object of the invention consists in the production of a storage battery comprising plates in which the active material is of greater strength and purity and of increased and uniform porosity which will enable a better circulation of the electrolyte and in which the conductivity of the active element will be increased by the perfect electric contact between the particles of the active material, so that the electrical resistance will be reduced and in which, by reason of the purity and porosity of the active material, substantially no local electric action will take place and polarization during a heavy rate of charge or discharge will be substantially eliminated.

A further object of the invention is to produce plates for a storage battery which will not warp or buckle and which will be of such a character that the breaking away of the active element during charging and discharging will be substantially eliminated.

A further object of the invention is to provide an electric battery of a character which will not require the positioning of separator plates between the positive and negative plates of the battery whereby the resistance of the usual separator plates to the passage of the electric current through the electrolyte will be eliminated.

A further object of the invention is to provide a storage battery in which the negative and the positive plates as initially constructed will be composed of a core or grid having pure sponge lead integrally attached or welded thereto.

A further object of the invention is to provide positive and negative plates for a storage battery which as initially formed comprise pure sponge lead in fibrous form compressed upon the cores, or into the interstices of the grid, without destroying the fibrous character of the sponge lead, whereby the active material of the plates will have a substantially uniform porosity throughout the plates so that the desired chemical action may readily take place upon all of the particles of the active material forming said plates.

A further object of the invention consists in providing a novel process of forming storage battery plates of the character above described which will enable both the positive and negative plates to be rapidly formed.

Another object of the invention consists in treating the plates in such a manner during their production that the necessity for the long period of charging usually required in the production of storage batteries will be rendered unnecessary and a completely charged storage battery produced within the period of less than an hour, whereas in batteries as heretofore produced the construction and charging of the batteries usually requires several days.

Other objects and features of the invention will more fully appear from the following description and the accompanying drawings and will be pointed out in the annexed claims.

A preferred form of storage battery embodying my invention is illustrated in the accompanying drawings in which, Fig. 1 is a vertical transverse section through the battery showing one of the plates in side elevation.

Figure 1:
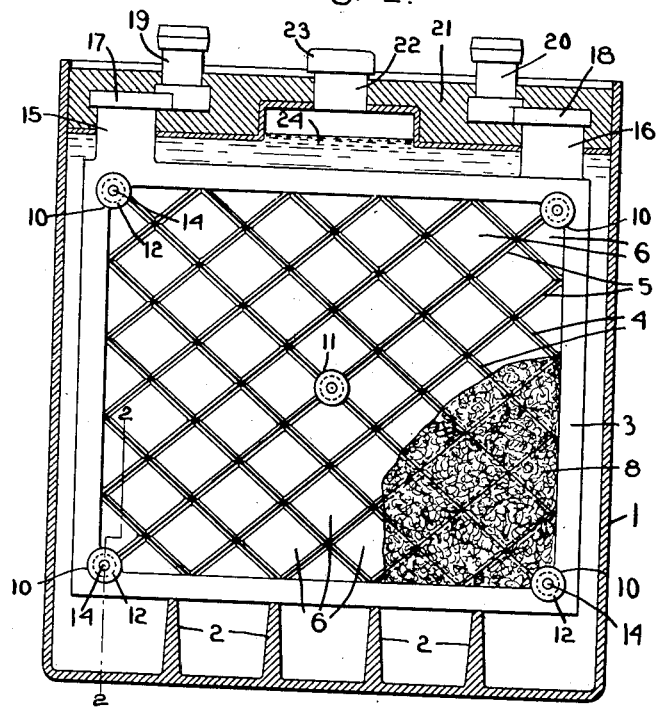
Figure 2:
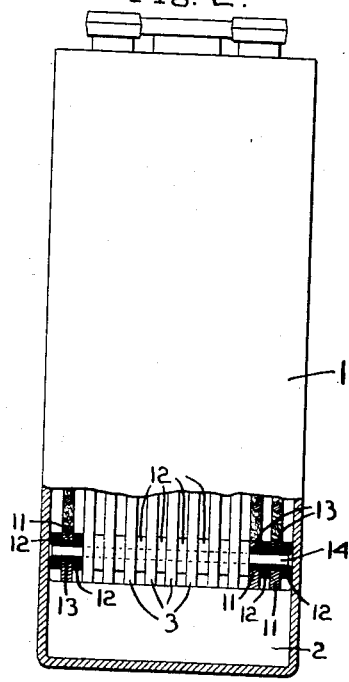
Fig. 2 is an end elevation of the same, a portion of the wall of the battery being broken away and parts of certain of the plates and grids shown in cross section.

In usual storage battery constructions the positive and negative plates comprise grids formed of lead and antimony, to which is secured a paste which is later converted into the active material of the plates. Various formulas are utilized by different manufacturers in the formation of the paste for the plates. Ordinarily, however, the paste for the positive plate is composed mainly of red lead ($Pb_3O_4$), and the negative plate of litharge ($PbO$), or a mixture of the two, in which the red lead predominates in the positive plate and the litharge in the negative plate. In preparing this composition both the red lead and litharge, being in granular form, are usually mixed with dilute sulphuric acid to form a paste of proper consistency, the action of the sulphuric acid upon the red lead and litharge producing lead sulphate crystals which serve to bind together the active material as well as to give porosity to the plates during the use of the battery.

When the plates are thus formed a considerable amount of impurities, in addition to the lead sulphate crystals, remain within the active material which are likely to cause local electric action which in itself reduces the efficiency of the plate and which results in the production of gases that further interfere with the plate's efficiency.

In the usual construction of batteries the plates thus produced are placed in an electrolyte of sulphuric acid and water and charged by a current which is passed through the electrolyte. This causes an electric chemical action in which the active material, namely litharge of the negative plate, is reduced to a more or less impure sponge lead, while at the same time the active material of the positive plate is converted into lead peroxide, ($PbO_2$).

In the process of charging the plates for storage batteries, a large number of plates are mounted in long tanks, the positive and negative plates alternating as in the battery cell but with more space between them, the positives being all connected in one group and the negatives in another. In order properly to form the positive and negative plates a prolonged charge, produced by a small current, is required so that the charging operation ordinarily takes several days. Otherwise, the chemical action upon the active materials of the paste will cause a generation of gases which would break away the material thus injuring or destroying the plates.

In this charging operation the sponge lead produced upon the negative plate is of granular form and the particles do not cohere as intimately as is desirable. The present invention contemplates the production of plates for storage batteries in which both the positive and negative plates are primarily formed of cores or grids to which is secured, or upon which is deposited, sponge lead produced electro-chemically from a suitable solution. The sponge lead thus formed is formed integrally upon, or welded to, the grids in such a manner as to produce a perfect electric conductivity of the grid. The formation of the sponge lead desirably is so controlled that it is of a fibrous nature as distinguished from a granular or crystalline condition.

The pure sponge lead which is employed in the construction of the storage battery plates embodying my invention may be produced by electrodeposition upon a zinc or iron cathode from a solution of acetate of lead, or may be produced by electrodeposition from a saturated solution of lead in hydroxide of potash, or it may be produced directly from a suitable solution upon the usual cores or grids which are to be used in the storage battery. In either case by proper manipulation of the current and by selective use of cathodes and anodes of proper size the sponge lead may be deposited in a metallic form, as a plating, or a fibrous form, or substantially in a crystalline form, or as a "tree," the character of the deposition being dependent upon the regulation of the amperage and voltage of the electric current and the character of the anode and cathode. Where a small cathode surface is used and a large anode surface, a current of large amperage and low voltage will produce the fibrous sponge lead whereas with the anode and cathode of substantially the same size and an amperage and voltage of substantially equal amount a metallic deposit like an electroplating will be produced. If a large cathode and a small anode are used with a high voltage and low current the deposition will be in the form of crystals or of "tree form."

In producing the sponge lead for the active material of storage battery plates embodying my invention cathodes and anodes of suitable size are utilized to enable a heavy current of low voltage to produce the sponge lead with great rapidity, the sponge lead thus produced being of a fibrous form in which the particles of each fibre so intimately cohere as to provide practically perfect conductivity through the fibre. If the fibrous sponge lead is produced upon platother than the cores or grids, which are to be used in the battery, it may be removed from the cathode, pressed into blocks and subsequently sawed or cut into suitable slabs for application to the battery plates.

In the preparation of the cores or grids for the reception of the sponge lead slabs the grids desirably are immersed in one of the solutions above mentioned and a suitable current applied to cause the deposition of a film of metallic lead upon the surface of the core or grid. It is found that when the sponge lead is applied to a recently deposited plating of this character under pressure that an intimate welding of the sponge lead to the grids or cores will take place because of the nascent properties of the freshly deposited lead film; consequently, a maximum conductivity between the sponge lead and the cores or grids is obtained.

It is found that where sponge lead is thus directly produced by electrochemical depositions upon the cores or grids of the battery plates; or where the plates are formed by pressing slabs of sponge lead upon grids the surfaces of which have recently been plated as above described, the fibrous character of the sponge lead will not be destroyed even though a thickness of sponge lead of two or three times that of the grid is pressed into the interstices between the cross bars of the grids, or the sponge lead reduced to a similar thickness if applied to a plain core. In either instance the fibrous character of the sponge lead enables a plate to be produced which has a substantially uniform porosity throughout which permits free access of the electrolyte in the cell to all particles of the sponge lead so that a proper chemical action takes place throughout the entire thickness of the plate. Furthermore, the fibrous character of the lead enables the plates to have an electric conductivity far in excess of any heretofore produced.

The plates thus formed being of pure sponge lead, produced by electric deposition, retain in a measure a negative charge and are ready for instant use in the storage battery.

In order to form a positive plate these negative plates, the surfaces or interstices of which are composed of pure sponge lead, are discharged in the usual way by short circuiting in the usual electrolyte solution of sulphuric acid and water. They are then washed to remove the acid and allowed to dry. The dry plates are then immersed in an oxidizing solution, preferably a 10% solution of equal parts by weight, of sulphuric acid and potassium bichromate. This solution is immediately absorbed in the pores of the sponge lead and oxidation at once takes place. This action, however, may be hastened by the application of a positive current, sheet lead dummy plates being used as negative electrodes and placed alternately between the plates which are being treated. A heavy current may be utilized in the oxidation of the positive plates so that the sponge lead may be completely transformed into lead peroxide within the space of about half an hour as compared with the number of days' time which is required to charge the usual positive battery plates made of red lead and litharge paste.

Furthermore, the lead peroxide thus produced by electrochemical action is chemically pure and consequently free from the impurities which are present in the positive plates produced from the red lead and litharge paste. In the plates produced by the foregoing process the uniform porosity of the active material is retained so that the electrolyte of the battery in which the plate is used is permitted to have free access to all parts of the active material.

Furthermore, in thus producing the lead peroxide for the positive plate the plate itself is given a positive charge so that when it is placed in the battery cell with the negative plate, which as above described has retained the negative charge produced during its production, the storage battery itself is in substantially a perfect condition for use and needs only such charging as may be required to overcome the deterioration due to the handling of the plates.

By this process of producing battery plates a complete storage battery may be constructed and charged within an hour's time and the battery thus produced will, by reason of the greater conductivity of the materials of the active elements, the absence of local electrolytic action and the production of gases, produce a higher voltage and a greater amperage than batteries having plates of equal size formed by the old methods above described.

A battery comprising plates constructed in accordance with the process heretofore described is illustrated in the accompanying drawings in which the cell comprises the usual rectangular box or casing 1 of rubber or vulcanite, or other suitable material, having at its bottom upwardly extending ribs 2 adapted to support the under edges of the battery plates. The battery plates preferably are in the form of rectangular grids formed of an alloy of lead and antimony provided with solid marginal portions 3 and preferably diagonally extending ribs 4 and 5 which intersect in such a manner as to form diamond shaped apertures 6.

Figure 4:
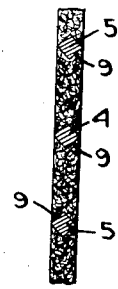
Figure 3:
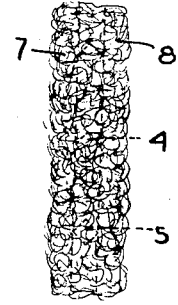
Fig. 3 is a transverse sectional view of one of the plates of the battery showing the grid in dotted lines with fibrous sponge lead secured to, or deposited therein, and, Fig. 4 is a detail sectional view through a completed plate showing the fibrous character of the active material which lies in the interstices between the cross bars of the grid of the plate.

The ribs 5 preferably are diamond shape or rectangular in cross section with the edges flush with the plane of the marginal portions 3 of the grid, as illustrated in Fig. 4.

In the preparation of the plates slabs of sponge lead 7 and 8 are placed upon the opposite sides of the grids, the surfaces of the ribs and margins having previously been given a coating or plating 9 of metallic lead. The sponge lead slabs are then pressed into the interstices 6 between the ribs until the outer surfaces are flush with the surfaces of the marginal portions 3 of the grid. It will be observed that the diamond shaped form of the ribs is such as to cause a compression or condensation of the approaching faces of the slabs as they are pressed upon the plate and this assists in causing an intimate interlocking or welding together of the adjacent faces of the slabs so that the faces of the slabs are practically welded together into a homogeneous mass. The plates thus constructed are not subject to washing away or distortion during the charging or discharging of the battery, even though a heavy current is utilized or produced; consequently the use of separator plates between the positive and negative plates of the battery may be avoided.

In the preferred battery construction illustrated in the accompanying drawings the marginal portions 3 of both the positive and negative plates are provided adjacent their corners with bosses 10 and a central boss 11 desirably also is provided at the intersection of the diagonal ribs which run from corner to corner of the plate. These bosses are provided with apertures adapted to receive a spacing thimble. The spacing thimble desirably comprises a cylindrical head portion 12 and a stem portion 13 extending therefrom a distance equal to the thickness of the battery plates. The thimbles are provided with a central aperture which is adapted to receive a connecting rod 14.

In assembling the plates the stems 13 of the washers are passed through suitable apertures in the plates, the positive and negative plates being alternately arranged. When as many plates as desired have been thus assembled the rods 14, which preferably are of rubber, are passed through the thimbles and are expanded at their ends by the application of a heated iron so that the plates are firmly secured together. The positive and negative plates are thus separated only by the heads 12 of the thimbles so that the electrolyte is enabled to flow freely between the plates and the resistance which is usually interposed to the flow of the electric current by the use of separator plates is entirely eliminated. The assembled plates may then be inserted in the casing 1 of the battery in the usual manner.

The upper ends of each of the positive and negative plates are provided wtih the usual extensions or lugs 15 and 16 respectively which are engaged by strap plates 17 and 18 which lead to the usual terminal posts 19 and 20. Any suitable cover 21 may be provided for the battery, the cover having the usual filling opening 22 provided with a removable cap 23 through which the electrolyte 24 may be introduced.

Any suitable electrolyte may be employed such as the ordinary solution of sulphuric acid and water. I prefer, however, to use a special electrolyte of solid consistency in conjunction with the plates aforesaid. This, however, does not form an essential part of the present invention and is not, therefore, described herein.

It will be understood that the battery and process of constructing the same herein described constitutes the preferred embodiments of my invention, but that the same are not restrictive, that the sponge lead and the plates may be produced by other processes and may be constructed in other ways within the spirit and scope of the following claims.

Having thus described my invention, what I claim as new and desire to secure by Letters Patent, is:

1. A storage battery having a negative plate consisting of a supporting grid the interstices of which are filled with electrically refined homogeneous pure fibrous sponge lead united to said grid by a film of pure lead integrally united to said grid and to said sponge lead.

2. A storage battery having a positive plate the active element of which consists of electrically refined fibrous sponge lead homogeneously peroxidized.

3. A storage battery having a positive plate consisting of a supporting grid the interstices of which are filled with electrically refined pure fibrous sponge lead homogeneously peroxidized.

4. A storage battery having a positive plate consisting of a supporting grid the interstices of which are filled with electrically refined fibrous sponge lead in compressed form homogeneously peroxidized.

5. The process of producing negative plates for storage batteries which consists in producing slabs of fibrous sponge lead from a suitable solution by electric chemical deposition, coating a supporting grid or core with a plating of metallic lead by electro-chemical deposition and compressing the slabs of fibrous sponge lead upon said grid while said plating is in a nascent state whereby said sponge lead will be homogeneously attached to the grid.

6. The process of producing positive plates for storage batteries which consists in producing slabs of fibrous sponge lead by electric deposition from a suitable chemical solution, compressing said slabs of fibrous sponge lead upon a core or grid and treating the plate thus produced to an oxidizing agent whereby the sponge lead will be transformed into pure lead peroxide.

7. The process of producing positive plates for storage batteries which consists in producing slabs of fibrous sponge lead by electric deposition from a suitable chemical solution, compressing said slabs of fibrous sponge lead upon a core or grid and treating the plate thus produced to the action of an oxidizing agent in the presence of a current of electricity whereby the sponge lead will be transformed to pure homogeneous peroxide of lead.

In testimony whereof, I have signed my name to this specification.

ALBERT H. WILLIAMS.